United States Patent Office 3,816,582
Patented June 11, 1974

3,816,582
PROCESS FOR THE MANUFACTURE OF
CYLINDERS
Roderick C. Tennyson, 12 Shasta Drive,
Thornhill, Ontario, Canada
Continuation-in-part of abandoned application Ser. No.
69,835, Sept. 4, 1970. This application Oct. 24, 1972,
Ser. No. 300,018
Int. Cl. B29c 5/08
U.S. Cl. 264—255                         6 Claims

ABSTRACT OF THE DISCLOSURE

In the manufacture of cylinders comprising two concentric cylindrical shells with an interposed core comprising radially extending gas-filled cells a thin support layer which is porous to the material from which the inner shell is spun cast is applied to the inner face of the core and the inner shell is spun cast against the support layer.

CROSS REFERENCE TO RELATED APPLICATION

This application is a continuation-in-part of my application Ser. No. 69,835, filed 4th September 1970, now abandoned.

Field of the invention

This invention is concerned with a new process for the manufacture of cylinders of the type comprising at least two concentric cylindrical shells and an interposed core.

At the present time there is a need for the production of accurately formed cylinders of high strength and light weight, for example, in various aerospace applications. These desirable properties of strength and weight can be achieved, for example, by forming the cylinder from a pair of spaced concentric shells with an interposed core, but the production of such cylinders hitherto has involved complex and expensive processes employing complex and expensive apparatus.

DEFINITION OF THE INVENTION

It is an object of the present invention to provide a new process for the manufacture of cylinders of the type specified.

It is a more specific object to provide a new process for the manufacture of cylinders of the type specified and comprising spun-cast concentric inner and outer cylindrical shells with an interposed core of the honeycomb type.

In accordance with the present invention there is provided a process for the manufacture of a cylinder comprising spaced inner and outer concentric cylindrical shells of which at least the inner shell is formed of flowable solidifiable material and which have bonded thereto an interposed core of open-cell type material disposed with the cell ends opening radially and closed by the shells, the process including the steps of:

(a) providing the said outer shell, (b) applying and bonding to the inner cylindrical surface of the outer shell a layer of said core material, (c) applying to the inner surface of the core material layer a thin support layer porous to the solidifiable material and which is effective to prevent excessive percolation of the flowable material into the core material, but is sufficiently porous to be completely inpregnated with the flowable material.

(d) rotating the outer shell, the core material and the support layer and forming the inner shell against the said support layer by spin casting from the said flowable, solidifiable material under setting conditions for the material, with the speed of the said rotation such that the solidifiable material penetrates the support material and solidifies therein without excessive percolation of the solidifiable material into the core material.

DESCRIPTION OF THE DRAWINGS

Particular preferred embodiments of the invention will now be described, by way of example, with reference to the accompanying drawings, wherein.

DESCRIPTION OF THE PREFERRED EMBODIMENTS

Figure 1:
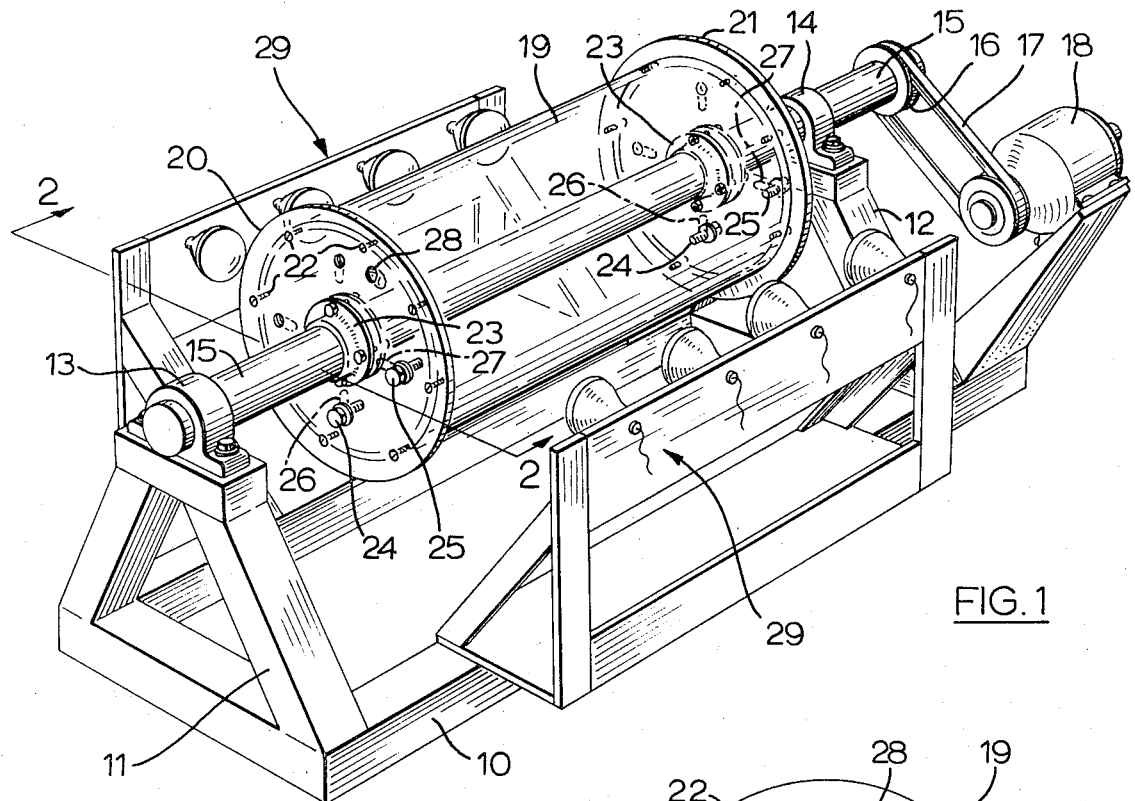
FIG. 1 is a perspective view of an apparatus employed in the operation of processes in accordance with this invention.
Figure 2:
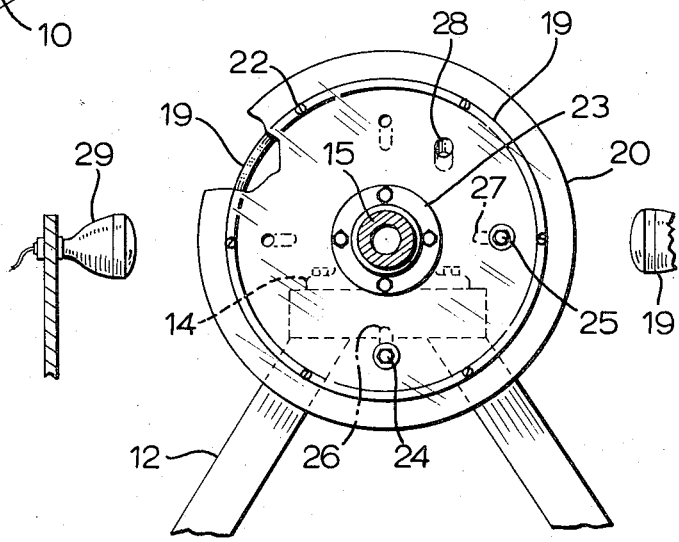
FIG. 2 is a partial end view to show particular features thereof.

A typical simple spin-casting apparatus for the operation of processes of the present invention comprises a rigid rectangular base frame 10, having two parallel spaced generally-triangular standards 11 and 12 upstanding vertically therefrom, each of the standards carrying a respective self-aligning bearing 13 and 14 mounting a relatively massive, rigid shaft 15 for rotation about a horizontal axis. One end of the shaft 15 carries a pulley 16, which is connected by a belt 17 to a variable speed electric driving motor 18 mounted on the base frame.

A cylindrical mould in which the cylinders are formed comprises a tubular body 19 provided with circular end plates 20 and 21 removably fastened to the body, as by machine screws 22. The mould is mounted on the shaft 15 coaxially therewith by two flanged members 23 bolted to the end plates, these members being rotatable with the shaft 15 to rotate the mould, and at least one of them being movable axially along the shaft to permit the mould to be dismantled from the shaft.

The manufacture of accurately-formed cylinders of uniform external diameter requires the use of a mould drum with an accurately-formed internal surface that is truly co-axial with the shaft. Preferably, the drum 15 is formed of a transparent material, such as methyl methacrylate plastic, so that the progress of the process can readily be observed. In an initial step of the operation of the processes of the invention the mould drum internal cylindrical surface is prepared to the required accuracy.

Each end plate 20 and 21 is provided with two adjustable mass balance weights 24 and 25, which may comprise two bolts each mounted in a respective screw-threaded aperture, the two apertures being disposed respectively on radii which are at right angles to one another. The weights also comprise washers of different sizes and thicknesses, which can be clamped between the bolt heads and the end plates.

In another arrangement the bolts 24 and 25 are movable in respective radially-extending slots 26 and 27 (shown in broken lines), the slots being disposed with their longitudinal axes at a right angle to one another. In such an arrangement each end plate can be provided with a diametrically-opposed similar slot to maintain the primary balance of the plate and to permit movement of each balance weight to the other side of the longitudinal axis, if that should be necessary. Other methods of achieving static balance adjustment of the mould drum will be apparent to those skilled in the art.

The internal surface of the drum may first require a cleaning operation, as by subjecting it to the washing action of a solvent, e.g. alcohol; the drum and shaft combination is then statically balanced as accurately as possible and, if the balancing has not been carried out in situ, it is then remounted in the bearings 13 and 14.

A thin layer of a suitable releasing agent is first applied to the inner cylindrical surface of the mould drum, preferably by spin-casting so as to avoid any change in the accuracy of formation of the surface. The material can be applied in the form of a solution inserted via a pouring hole 28 in one end plate, the solvent being evaporated while the drum is rotated at an appropriate rate.

Figure 3:
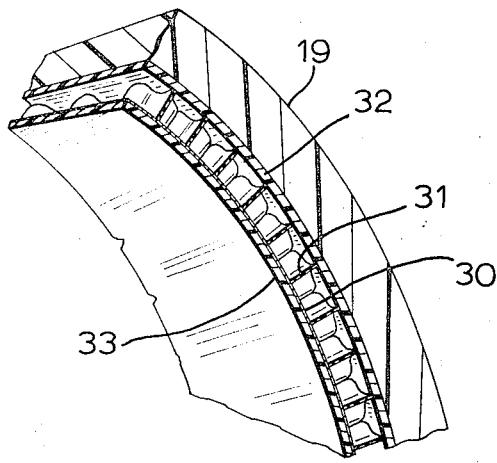
FIG. 3 is a cross section through part of the wall of a cylinder produced in accordance with the invention, in order to show the structure thereof, the drawing being to an enlarged scale.

The outer circular cross-section cylindrical shell 30 (see FIG. 3) is then spun-cast in the mould from any suitable flowable solidifiable plastic material of viscosity low enough in the flowable state to flow over the mould interior and form a uniform layer. More than one layer can be employed in the formation of the shell, the subsequent layers preferably being applied before final curing of the immediately preceding layer so that they bond strongly together. If necessary, the rate of setting of the plastic material is increased by the application of heat to the drum, for example by means of diametrically-opposed rows of radiant heaters 29.

In some embodiments the outer shell may be of composite material, for example by incorporating a fibrous material therein. Such composite materials are formed by adding chopped fibers of material such as glass, carbon or boron during any part of the shell formation process, or by adding one or more layers, in fabric or non-woven mat form, inserted into or between any of the layers of the shell. Any of the added compositing materials can be pre-wetted with plastic material to facilitate its incorporation. With appropriate values of angular velocity of the drum to produce sufficient centrifugal force, trapped air bubbles are driven from the liquid plastic and, in the case of composites, several layers can be completely impregnated during one spin casting operation. Additional thickness can be obtained by successive spin-casting of new layers. Good bonding between juxtaposed layers is achieved if proper curing times are used, the additional layers are added at appropriate times during the curing of the preceding layers, and the newly formed surfaces of the layers are maintained free from contamination.

In these particular embodiments the open-cell type material forming the core 31 is a sheet of honeycomb configuration, comprising juxtaposed open-ended hexagonal cells with the longitudinal axes of the cells perpendicular to the general plane of the sheet. Depending upon the cylinder radius and the stiffness of the honeycomb sheet, the core material can be inserted in the form of a single sheet, with a longitudinal butt joint, or as several butting longitudinal segments. Prior to insertion of the core into the mould a very thin layer of the liquid resin forming the outer shell is applied to the shell inner surface and/or to the honeycomb sheet surface that contacts the shell inner surface. By the use of a high enough speed of rotation the core material is urged radially outward and held in complete contact with the outer shell while the plastic sets or cures, thereby achieving excellent bonding of the core to the outer shell inner surface. In another process the core material may be bonded to the outer shell by permitting the shell, or the innermost layer thereof, to cure to the extent that it is self-supporting if the drum is stopped but is still tacky. The core material is then placed in position and the drum spun while the resin cure is completed and secures the core layer to the shell.

A thin, porous support layer 32 is now applied to the inner surface of the core material layer. The exact porosity required for this layer to produce the most effective results for the particular process can readily be determined by simple experimentation. Suitable materials are for example, thin tissue paper, kraft paper, bond wrapping paper, fine mesh materials, and thin fabrics such as glass fibre fabric. The support layer material will usually be sufficiently thin that it can be permitted to form a longitudinal overlap join in the mould.

The support layer may be pre-impregnated with the same solidifiable liquid material that is used for forming the inner shell, or with a plastic material compatible therewith. After application of the support layer the mould is rotated to press the layer into close contact with the adjacent surface of the core layer.

Any plastic material of the support layer may now be permitted to cure, for a predetermined period. Immediately upon placement of the support layer or at any time before full curing of any plastic material in the support layer can take place, the inner shell 33 is formed by spin-casting at least one layer of flowable solidifiable material against the support layer, which is effective to prevent excessive percolation of the flowable material into the core material, but is sufficiently porous to be completely impregnated with the flowable material if not already in this state, so that it is substantially completely incorporated in the inner shell upon solidification of the material. The inner shell 33 is thereby strongly bonded to the adjacent surface of the core layer 31, despite the presence of the intervening support layer. With many of the materials used for the support layer inspection of the resultant product shows that the support layer has become translucent, and this phenomenon can be used as an indication of the etxent to which complete penetration of the support layer by plastic material has taken place. Thus the absence of the desired complete penetration in any spot will be revealed by the non-translucent appearance of that part of the support layer. Moreover, it is frequently found that sufficient plastic material has penetrated the support layer to form a meniscus in the immediately adjacent ends of the open cells of the core material, ensuring particularly strong bonding between the core and the inner shell.

Upon the formation and curing of the final layer of the inner shell the cylinder can be removed from the mould cylinder 19 by any convenient means, for example by use of an end plug urged by a hydraulic jack, the release layer permitting this operation without damage to the mould inner surface. The cylinder is immediately ready for use for many purposes, or it may require that the annular ends be sealed by any suitable means. The resultant cylinder may be slit longitudinally to form corresponding laminated curved panels, whose edges are then sealed.

Table 1 below shows materials that have been used in the successful production of cylinders by processes of the invention and which may be used in combination with one another.

TABLE 1

Shell wall materials:

Hysol XC9–C419 resin of Hysol Corp. with #3646 hardener about 300 to 500 centipoise viscosity.
  Araldite 502 epoxy resin of Ciba Products Co. with #951 hardener (about 400 centipoise).
  Polyester of about 800 centipoise viscosity.

Core material:

Nomex HRH–10 of Hexcell Aerospace Corp.
  Flex-core 5052 aluminum honeycomb of Hexcell Aerospace Corp.

Support layer:

Kraft paper
  Blended paper of 75% cotton and 25% kraft

Table 2 below shows preferred values of spin-casting velocities employed with the materials of Table 1.

TABLE 2

| Cylinder radius, inches: | Spin-casting velocity, r.p.m. |
|---|---|
| About 3–6 | About 1500–3000 |
| About 6–9 | About 1000–1500 |
| About 9–12 | About 750–1000 |

Table 3 shows the casting times for typical materials of Table 1, with a shell wall thickness of about 0.050 inch.

TABLE 3

| Temp., °F. | Casting time each wall, hrs. |
|---|---|
| 75° | About 6–7 |
| 140° | About 3–4 |
| 200° | About 1–2 |

Table 4 lists recommended spin casting parameters for support layers of various materials. These recommendations are based upon the use of a flowable resin system having a viscosity in the flowable state not exceeding 1000 centipoises, for a temperature not exceeding 275° F., and for any metal or reinforced plastic cellular core. The spin casting velocities given are based on the production of an 18 inch diameter cylinder.

TABLE 4

| Support layer material: | Spin casting velocity r.p.m. |
|---|---|
| Kraft paper<br>Cotton/kraft paper blend 75/25 | About 1000 |
| Synthetic fabrics such as rayon, Dacron, nylon, polyester | About 500 |
| Industrial glass fabrics such as #181–139 or #025 of Bay Mills glass fibre matting | About 500 |

Other non-plastic layers may be applied over the inner and outer shells, such as thin sheet metal and another embodiment may comprise a thin metal outer laminae or shell having a layer of core material bonded thereto and an inner plastic shell formed against the core layer by the use of a support layer. Curable thermosetting compounds have been particularly described for use in the products of the inner shell, but thermoplastic materials and cementious materials can also be employed that exhibit the viscosity for satisfactory flow to form a uniform cylinder at spin velocities that are practical for typical commercial processes.

I claim:

1. A process for the manufacture of a cylinder comprising spaced inner and outer concentric cylindrical shells of which at least the inner shell is formed of flowable solidifiable material and which have bonded thereto an interposed core of open-cell type material disposed with the cell ends opening radially and closed by the shells, the process including the steps of;

(a) providing the said outer shell, (b) applying and bonding to the inner cylindrical surface of the outer shell a layer of said core material, (c) applying to the inner surface of the core material layer a thin support layer porous to the solidifiable material and which is effective to prevent excessive percolation of the flowable material into the core material, but is sufficiently porous to be completely impregnated with the flowable material, (d) rotating the outer shell, the core material and the support layer and forming the inner shell against the said support layer by spin casting from the said flowable, solidifiable material under setting conditions for the material, with the speed of the said rotation such that the solidifiable material penetrates the support material and solidifies therein without excessive percolation of the solidifiable material into the core material.

2. A process as claimed in claim 1, wherein the spin casting causes flowable, solidifiable material to pass completely through the support layer material for bonding the inner shell to the core through the support layer.

3. A process as claimed in claim 1, wherein the said outer shell is spun-cast from flowable, solidifiable material.

4. A process as claimed in claim 1, wherein the said flowable solidifiable material is a thermosetting resin and heat is applied to the material during the formation of the inner shell to speed the curing thereof.

5. A process as claimed in claim 1, wherein the material of the support layer is pre-impregnated with the said flowable solidifiable material, or a material compatible with the flowable solidifiable material.

6. A process as claimed in claim 1, wherein the said core material has the form of a honeycomb with radially disposed cells of hexagonal cross-section.

References Cited

UNITED STATES PATENTS

| 2,739,917 | 3/1956 | Schulze | 264—311 |
| 3,012,922 | 12/1961 | Wiltshire | 264—311 |

FOREIGN PATENTS

| 27,650 | 8/1964 | Japan | 264—311 |
| 1,324,273 | 3/1963 | France | 264—257 |

ROBERT F. WHITE, Primary Examiner

T. P. PAVELKO, Assistant Examiner

U.S. Cl. X.R.

264—257, 270, 311